(12) United States Patent
Oxaal

(10) Patent No.: US 6,323,862 B1
(45) Date of Patent: *Nov. 27, 2001

(54) APPARATUS FOR GENERATING AND INTERACTIVELY VIEWING SPHERICAL IMAGE DATA AND MEMORY THEREOF

(76) Inventor: Ford Oxaal, 42 Western Ave., Cohoes, NY (US) 12047

( * ) Notice: Subject to any disclaimer, the term of this patent is extended or adjusted under 35 U.S.C. 154(b) by 0 days.

This patent is subject to a terminal disclaimer.

(21) Appl. No.: 09/349,241

(22) Filed: Jul. 8, 1999

Related U.S. Application Data

(63) Continuation of application No. 08/813,873, filed on Mar. 7, 1997, now Pat. No. 5,936,630, which is a continuation of application No. 08/478,839, filed on Jun. 7, 1995, now Pat. No. 5,684,937, which is a continuation of application No. 07/990,250, filed on Dec. 14, 1992, now abandoned, and a continuation of application No. 09/228,760, filed on Jan. 12, 1999, which is a continuation-in-part of application No. 08/749,166, filed on Nov. 14, 1996, now Pat. No. 5,903,782.

(60) Provisional application No. 60/071,148, filed on Jan. 12, 1998, and provisional application No. 60/006,800, filed on Nov. 15, 1995.

(51) Int. Cl.[7] .................................................. G06T 11/40
(52) U.S. Cl. ............................ 345/430; 345/427; 348/36
(58) Field of Search .................................. 345/427, 430; 348/36

(56) References Cited

U.S. PATENT DOCUMENTS

| 1,730,346 | 10/1929 | Beeson et al. . |
|---|---|---|
| 3,183,810 | 5/1965 | Campbell et al. . |

(List continued on next page.)

FOREIGN PATENT DOCUMENTS

| 2-127877 | 5/1990 | (JP) . |
| 82/03712 | 10/1982 | (WO) . |
| 96/08105 | 3/1995 | (WO) . |
| 96/26611 | 8/1996 | (WO) . |

OTHER PUBLICATIONS

M. Onoe et al., "Digital Processing of Images Taken by Fish–Eye Lens", IEEE: Proceedings, New York 1982, vol. 1, pp. 105–108.

N. Greene, "Environment Mapping and Other Applications of World Projections", IEEE Computer Graphics and Applications, Nov. 1986, pp. 21–29.

N. Greene, "A Method of Modeling Sky for Computer Animations", Proc. First Intl'l. Conf. Engineering and Computer Graphics, Aug. 1984, pp. 297–300.

J. Blinn et al., "Texture and reflection in Computer Generated Images," Comm. ACM, vol. 19, No. 10 1976, pp. 542–547.

(List continued on next page.)

*Primary Examiner*—Mark Zimmerman
*Assistant Examiner*—Lance W. Sealey
(74) *Attorney, Agent, or Firm*—Westerlund Powell, P.C.; Raymond H. J. Powell, Jr.; Robert A. Westerlund

(57) ABSTRACT

An apparatus for modeling the visible world using a spherical data set includes a first device means for generating the spherical data set, the first device having a wide angle lens which is pivotable around a predetermined focal point, a second device for selecting a viewpoint within a p-surface, a third device for texture mapping selected data of the spherical image data onto the p-surface such that the resultant texture map is substantially equivalent to projecting the selected data onto the p-surface from the viewpoint to thereby generate a texture mapped p-sphere, and a fourth device for displaying a predetermined portion of the texture mapped p-sphere. A memory which stores a seamless spherical image data set formed from N circular image data sets captured by a single lens, where the circular image data sets are taken from a single focal point of the lens, and where N is a positive integer greater than 1 is also described.

44 Claims, 20 Drawing Sheets

U.S. PATENT DOCUMENTS

| | | |
|---|---|---|
| 3,723,805 | 3/1973 | Scarpino et al. . |
| 4,125,862 | 11/1978 | Catano . |
| 4,152,724 | 5/1979 | Hunter . |
| 4,191,967 | 3/1980 | Dansac et al. . |
| 4,463,380 | 7/1984 | Hooks, Jr. . |
| 4,518,898 | 5/1985 | Tarnowski et al. . |
| 4,549,208 | 10/1985 | Kamejima et al. . |
| 4,591,250 | 5/1986 | Woodruff . |
| 4,661,855 | 4/1987 | Glcku . |
| 4,670,648 | 6/1987 | Hall et al. . |
| 4,728,839 | 3/1988 | Coughlan et al. . |
| 4,736,436 | 4/1988 | Yasukawa et al. . |
| 4,751,660 | 6/1988 | Hedley . |
| 4,772,942 | 9/1988 | Tuck . |
| 4,797,942 | 1/1989 | Burt . |
| 4,807,158 | 2/1989 | Branton et al. . |
| 4,835,532 | 5/1989 | Fant . |
| 4,858,002 | 8/1989 | Zobel . |
| 4,858,149 | 8/1989 | Quarendon . |
| 4,899,293 | 2/1990 | Dawson et al. . |
| 4,918,473 | 4/1990 | Blackshear . |
| 4,924,094 | 5/1990 | Moore . |
| 5,005,083 | 4/1991 | Grage et al. . |
| 5,020,114 | 5/1991 | Fujioka et al. . |
| 5,023,725 | 6/1991 | McCutchen . |
| 5,048,102 | 9/1991 | Tararine et al. . |
| 5,067,019 | 11/1991 | Juday et al. . |
| 5,068,735 | 11/1991 | Tuchiya et al. . |
| 5,077,609 | 12/1991 | Manelphe . |
| 5,130,794 | 7/1992 | Ritchey . |
| 5,157,491 | 10/1992 | Kassatly . |
| 5,159,368 | 10/1992 | Zemln . |
| 5,173,948 | 12/1992 | Blackham et al. . |
| 5,175,808 | 12/1992 | Sayre . |
| 5,185,667 | 2/1993 | Zimmerman . |
| 5,200,818 | 4/1993 | Neta et al. . |
| 5,231,673 | 7/1993 | Elenga . |
| 5,259,584 | 11/1993 | Wainwright . |
| 5,280,540 | 1/1994 | Addeo et al. . |
| 5,313,306 | 5/1994 | Kuban et al. . |
| 5,359,363 | 10/1994 | Kuban et al. . |
| 5,384,588 | 1/1995 | Martin et al. . |
| 5,396,583 | 3/1995 | Chen et al. . |
| 5,432,871 | 7/1995 | Novik . |
| 5,444,476 | 8/1995 | Conway . |
| 5,479,203 | 12/1995 | Kawai et al. . |
| 5,550,646 | 8/1996 | Hassan et al. . |
| 5,606,365 | 2/1997 | Maurinus et al. . |
| 5,682,511 | 10/1997 | Sposato et al. . |

OTHER PUBLICATIONS

F. Kenton Musgrave, "A Panoramic Virtual Screen for Ray Tracing", Graphics Gems, 1992, pp. 288–294.

J.D. Foley, et al., "Computer Graphics: Principles and Practice", 1990, 1996, pp. 229–381.

Douglas F. Dixon "DVI Video Graphics," Computer Graphics World, Jul. 1987.

S. Morris, "Digital Video Interactive–A New Integrated Format for Multi–Media Information", Microcomputer for Information Management, Dec. 1987, 4(4):249–261.

"Declaration of Scott Gilbert in Support of Defendant Infinite Pictures" Memorandum in Opposition to Plaintiff's Motion for Preliminary Injunction, Omniview, Inc. v. Infinite Pictures, Inc. Civ. Action No. 3–96–849.

A. Paeth, "Digital Cartography for Computer Graphics", Graphics Gems, 1990. pp. 307–320.

N. Greene et al., Creating Raster Omnimax Images from Multiple Perxpective Views Using the Elliptical Weighted Average Filter, IEEE Computer Graphics and Applications, Jun 1986, pp. 21–27.

S. Ray, "The Lens in Action", Hastings House, 1976, pp. 114–117.

F. Pearson II, "Map Projections Theory and Applications". CRC Press, Inc., 1990, pp. 215–345.

G, Wolbert, "Digital Image Warping", IEEE Computer Society Press. 1988.

NASA's Tina Camera Has a Wide–Angle Future, Science & Technology, Business Week, pp. 54–55, Mar. 6, 1995.

G. David Ripley, "DVI–A Digital MultiMedia Technology", Communications of the ACM Jul. 1989, vol.32 No. 7. pp. 811–822.

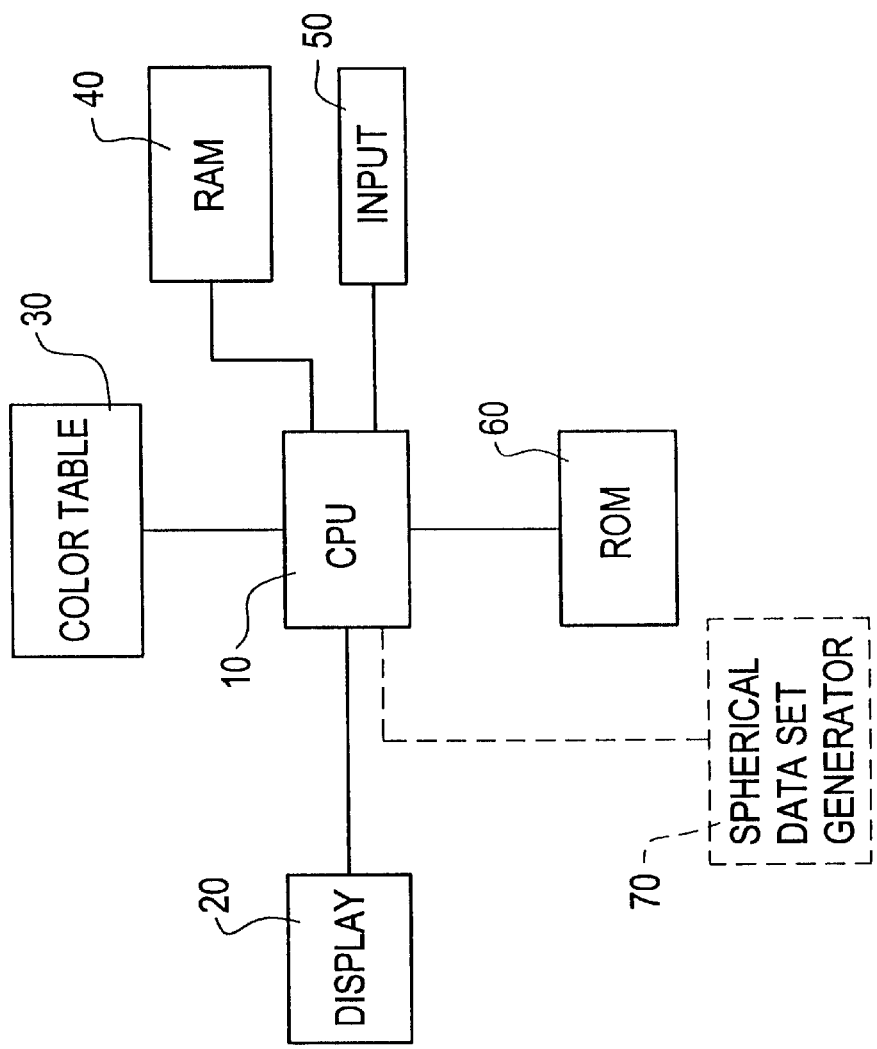

FIG. 9A

```c
/* Includes required */
#include <GL/gl.h>
include <GL/glut.h>
#include <stdio.h>
#include <ppm.h>
#include <math.h>

/**
 * something because of windows
 */
void __eprintf() {
}

/**
 * our data structure of choice
 */
typedef struct obj {
    /* other parameters */
    float matrix[16];

/* view angle */
    float viewangle;

/* aspect ratio */
    float aspect;

/* z of the camera */
    float tz;

/* ry of the camera */
    float ry;
} Obj;

/* hold the display lists for textures */
typedef struct texture {
    int tex1;
    int tex2;
} Texture;

/**
 * our global variables
 */
/* camera settings */
Obj scene;
```

FIG. 9B

```c
/* texture stuff */
Texture def;
Texture* current_texture = &def;

/* track the next display list number */
int nextDLnum = 2;

/* stuff for lighting */
float lightPos[4] = {2.0, 4.0, 2.0, 0};
float lightDir[4] = {0, 0, 1.0, 1.0};
float lightAmb[4] = {0.4, 0.4, 0.4, 1.0};
float lightDiff[4] = {0.8, 0.8, 0.8, 1.0};
float lightSpec[4] = {0.8, 0.8, 0.8, 1.0};
int lights = 0;
int outsideView = 0;
int parent;

#define HEMISPHERE 1
void createHemisphere(int listNum, int numPts, int geom);

/**
 * Read in the ppm files and create display lists for a texture
 * returns the dimension of the image
 */
pixel **map1, **map2;
GLubyte *tex1, *tex2, **tmpPP, *tmpP;
void readTexture(Texture* t, char* file1, char* file2) {
    FILE *fp1, *fp2;
    int cols, rows, i, j, index;
    pixval maxval;

/* open the files */
    fp1 = fopen(file1, "r");
    fp2 = fopen(file2, "r");
    if (!fp1) {
     fprintf(stderr, "Couldn't open %s\n", file1);
    }
    if (!fp2) {
     fprintf(stderr, "Couldn't open %s\n", file2);
    }

/* read the ppm files */
    map1 = ppm_readppm(fp1, &cols, &rows, &maxval);
    fprintf(stderr, "%s: rows = %d \t cols = %d\n", file1, rows,
    cols, maxval);
    map2 = ppm_readppm(fp2, &cols, &rows, &maxval);
```

FIG. 9C

```
    fprintf(stderr, "%s: rows = %d \t cols = %d\n", file2, rows,
cols, maxval);

/* convert them */
    tex1 = malloc(sizeof(GLubyte) * rows * cols * 3);
    tex2 = malloc(sizeof(GLubyte) * rows * cols * 3);
    index = 0;
    for (i = 0; i < rows; i++) {
     for (j = 0; j < cols; j++) {
        /* R */
        tex1[index] = PPM_GETR(map1[i][j]);
        tex2[index] = PPM_GETR(map2[i][j]);
        index ++;

/* G */
        tex1[index] = PPM_GETG(map1[i][j]);
        tex2[index] = PPM_GETG(map2[i][j]);
        index ++;

/* B */
        tex1[index] = PPM_GETB(map1[i][j]);
        tex2[index] = PPM_GETB(map2[i][j]);
        index ++;
     }
    }

/* create the textures */
    /* new display list*/
    glNewList(nextDLnum, GL_COMPILE);
    t->tex1 = nextDLnum;
    nextDLnum++;
    glTexImage2D(GL_TEXTURE_2D, 0, 3, cols, rows, 0, GL_RGB,
    GL_UNSIGNED_BYTE,
            tex1);
    glEndList();

/* new display list*/
    glNewList(nextDLnum, GL_COMPILE);
    t->tex2 = nextDLnum;
    nextDLnum++;
    glTexImage2D(GL_TEXTURE_2D, 0, 3, cols, rows, 0, GL_RGB,
    GL_UNSIGNED_BYTE'
            tex2);
    glEndList();
}
```

FIG. 9D

```
/**
 * this will initialize the display lists for the objects
 */
void initialize_objects(int argc, char**argv) {
    float tmp[4];

/* read in the texture */
    readTexture(&def, argv[1], argv[2]);

/* create hemisphere */
    createHemisphere(1, 50, GL_TRIANGLE_STRIP);

/* scene */
    scene.viewangle = 130;
    scene.tz = 0;
    scene.ry = 0;
}

/*
 * Clear the screen. draw the objects
 */
void display()
{
    float tmp[4];
    float height;

/* clear the screen */
    glClear(GL_COLOR_BUFFER_BIT | GL_DEPTH_BUFFER_BIT);

/* adjust for scene orientation */
    glMatrixMode(GL_PROJECTION);
    if (outsideView) {
     glLoadIdentity();
     gluPerspective(45, scene.aspect, 0.1, 10.0);
     glTranslatef(0, 0, -3);
     glRotatef(45, 1, 0, 0);
     glRotatef(45, 0, 1, 0);
     glDisable(GL_TEXTURE_2D);
     glColor3f(.8, .8, .8);
    } else {
     glLoadIdentity();
     gluPerspective(scene.viewangle, scene.aspect, 0.1, 10.0);
     glTranslatef(0, 0, scene.tz);
     glRotatef(scene.ry, 0, 1, 0);
    }
```

FIG. 9E

```
/* draw our models */
glMatrixMode(GL_MODELVIEW);
glPushMatrix();

if (outsideView) {
 /* transform to where the camera would be */
 glPushMatrix();

/* draw a cube for the camera */
 glLoadIdentity();
 glRotatef(180, 1, 0, 0);
 glTranslatef(0, 0, scene.tz);
 tmp[0] = tmp[1] = tmp[2] = .8;
 tmp[3] = 1;
 glMaterialfv(GL_FRONT_AND_BACK, GL_SPECULAR, tmp);
 glMaterialf(GL_FRONT_AND_BACK, GL_SHININESS, 0.0);
 glMaterialfv(GL_FRONT_AND_BACK, GL_AMBIENT_AND_DIFFUSE, tmp);
 glutSolidCube(.1);

/* draw a cone for the view frustrum */
 glLoadIdentity();
 height = 1 - scene.tz;
 glRotatef(45, 0, 0, 1);
 glTranslatef(0, 0, -1);
 tmp[0] = tmp[1] = 1;
 tmp[2] = 0;
 tmp[3] = .3;
 glMaterialfv(GL_FRONT_AND_BACK, GL_SPECULAR, tmp);
 glMaterialf(GL_FRONT_AND_BACK, GL_SHININESS, 0.0);
 glMaterialfv(GL_FRONT_AND_BACK, GL_AMBIENT_AND_DIFFUSE, tmp);
 glutSolidCone(tan(scene.viewangle * 3.14 / 360.0) * height,
height, 20, 1);
 glPopMatrix();
 glEnable(GL_TEXTURE_2D);
}

/* now draw the semisphere */
if (lights) {
 tmp[0] = tmp[1] = tmp[2] = .8;
 tmp[3] = .8;
 glMaterialfv(GL_FRONT_AND_BACK, GL_SPECULAR, tmp);
 glMaterialf(GL_FRONT_AND_BACK, GL_SHININESS, 10.0);
 glMaterialfv(GL_FRONT_AND_BACK, GL_AMBIENT_AND_DIFFUSE, tmp);
}
glCallList(current_texture->tex1);
glCallList(HEMISPHERE);
```

FIG. 9F

```c
    if (lights) {
     tmp[0] = tmp[1] = tmp[2] = .5;
     tmp[3] = .5;
     glMaterialfv(GL_FRONT_AND_BACK, GL_SPECULAR, tmp);
     glMaterialf(GL_FRONT_AND_BACK, GL_SHININESS, 10.0);
     glMaterialfv(GL_FRONT_AND_BACK, GL_AMBIENT_AND_DIFFUSE, tmp);
    } glRotatef(180.0, 0.0, 0.0, 1.0);
    glCallList(current_texture->tex2);
    glCallList(HEMISPHERE);
    glPopMatrix();

fprintf(stderr, "%s\n", gluErrorString(glGetError()));
    glutSwapBuffers();
}

/*
 *  Handle Menus
 */
#define M_QUIT 1
void Select(int value)
{
    switch (value) {
    case M_QUIT:
        exit(0);
        break;
    }
    glutPostRedisplay();
}
void create_menu() {
    fprintf(stderr, "Press ? for help\n");
    glutCreateMenu(Select);
    glutAddMenuEntry("Quit", M_QUIT);
    glutAttachMenu(GLUT_RIGHT_BUTTON);
}

/* Initializes hading model */
void myInit(void)
{
    glEnable(GL_DEPTH_TEST);
    glShadeModel(GL_SMOOTH);

/* texture stuff */
    glPixelStorei(GL_UNPACK_ALIGNMENT, sizeof(GLubyte));
    glTexParameterf(GL_TEXTURE_2D, GL_TEXTURE_WRAP_S, GL_CLAMP);
    glTexParameterf(GL_TEXTURE_2D, GL_TEXTURE_WRAP_T, GL_CLAMP);
```

FIG. 9G

```
    glTexParameterf(GL_TEXTURE_2D, GL_TEXTURE_MAG_FILTER,
GL_NEAREST);
    glTexParameterf(GL_TEXTURE_2D, GL_TEXTURE_MIN_FILTER,
GL_NEAREST);
    glTexEnvf(GL_TEXTURE_ENV, GL_TEXTURE_ENV_MODE, GL_DECAL);
    glEnable(GL_TEXTURE_2D);

}

/*
 * Called when the window is first opened and whenever
 * the window is reconfigured (moved or resized).
 */
void myReshape(int w, int h)
{
    glViewport (0, 0, w, h);                /* define the viewport */
    scene.aspect = 1.0*(GLfloat)w/(GLfloat)h;
    glMatrixMode(GL_PROJECTION);
    glLoadIdentity();
    gluPerspective(scene.viewangle, scene.aspect, 0.1, 10.0);
    glMultMatrixf(scene.matrix);
    glMatrixMode (GL_MODELVIEW);             /* back to modelview
    matriix */
}

/*
 * Keyboard handler
 */
void
Key(unsigned char key, int x, int y)
{
    float matrix[16];
    glMatrixMode(GL_MODELVIEW);
    glGetFloatv(GL_MODELVIEW_MATRIX, matrix);
    glLoadIdentity();
    fprintf(stderr, "%d - %c  ", key, key);
    switch (key) {
    case 'o':
     if (!outsideView) {
        fprintf(stderr, "outside on  ");
        outsideView = 1;

/* turn on blending */
        glEnable(GL_BLEND);
        glBlendFunc(GL_SRC_ALPHA, GL_ONE_MINUS_SRC_ALPHA);
```

FIG. 9H

```c
    /* We want to see color */
    glTexEnvf(GL_TEXTURE_ENV, GL_TEXTURE_ENV_MODE, GL_MODULATE);

/* turn on our spotlight */
    glEnable(GL_LIGHT1);
    glLightfv(GL_LIGHT1, GL_AMBIENT, lightAmb);
    glLightfv(GL_LIGHT1, GL_DIFFUSE, lightDiff);
    glLightfv(GL_LIGHT1, GL_SPECULAR, lightSpec);
    glLightfv(GL_LIGHT1, GL_SPOT_DIRECTION, lightDir);
  } else {
    fprintf(stderr, "outside off ");
    outsideView = 0;
    glTexEnvf(GL_TEXTURE_ENV, GL_TEXTURE_ENV_MODE, GL_DECAL);
    glDisable(GL_BLEND);
  }
  break;
case 'F':
  fprintf(stderr, "flat ");
  glShadeModel(GL_FLAT);
  break;
case 'f':
  fprintf(stderr, "smooth ");
  glShadeModel(GL_SMOOTH);
  break;
case 'y':
  printf("ry = %f\n", scene.ry);
  scene.ry -= 5;
  break;
case 'Y':
  scene.ry += 5;
  break;
case 'z':
  scene.tz -= .02;
  fprintf(stderr, " tz = %f  ", scene.tz);
  break;
case 'Z':
  scene.tz += .02;
  fprintf(stderr, " tz = %f  ", scene.tz);
  break;
case 'a':
  scene.viewangle -= 1;
  fprintf(stderr, " angle: %f  ", scene.viewangle);
```

FIG. 9I

```
   break;
case 'A':
 scene.viewangle += 1;
 fprintf(stderr, "angle: %f  ", scene.viewangle);
 break;
case 55:
 glRotatef(-5, 0.0, 0.0, 1.0);
 break;
case 57:
 glRotatef(5, 0.0, 0.0, 1.0);
 break;
case 52:
 glRotatef(-5, 0.0, 1.0, 0.0);
 break;
case 54:
 glRotatef(5, 0.0, 1.0, 0.0);
 break;
case 56:
 glRotatef(5, 1.0, 0.0, 0.0);
 break;
case 50:
 glRotatef(-5, 1.0, 0.0, 0.0);
 break;
case 'q':
 if (lights) {
     glDisable(GL_LIGHT0);
     glDisable(GL_LIGHTING);
     lights = 0;
     fprintf(stderr, "no lights  ");
 } else {
     glEnable(GL_LIGHTING);
     glEnable(GL_LIGHT0);
     glLightfv(GL_LIGHT0, GL_POSITION, lightPos);
     glLightfv(GL_LIGHT0, GL_AMBIENT, lightAmb);
     glLightfv(GL_LIGHT0, GL_DIFFUSE, lightDiff);
     glLightfv(GL_LIGHT0, GL_SPECULAR, lightSpec);
     lights = 1;
     fprintf(stderr, "lights  ");
 }
 break;
case 't':
 fprintf(stderr, "texture off  ");
 glDisable(GL_TEXTURE_2D);
 break;
case 'T':
 fprintf(stderr, "texture on  ");
 glEnable(GL_TEXTURE_2D);
 break;
```

FIG. 9J

```
    case '?':
     fprintf(stderr, "hjkl - rotate current object\n");
     fprintf(stderr, "s/S - shrink / grow the object or zoom the
scene\n");
     fprintf(stderr, "a/A viewangle\n");
     fprintf(stderr, "z/Z camera position\n");
     fprintf(stderr, "f/F flat smooth\n");
     fprintf(stderr, "Escape quits \n");
     break;
    case 27:            /* Esc will quit */
        exit(1);
        break;
    default:
     fprintf(stderr, "Unbound key - %d  ", key);
     break;
    }
    fprintf(stderr, "\n");
    glMultMatrixf(matrix);
    glutPostRedisplay();
}

/*
 * Main Loop
 * Open window with initial window size, title bar,
 * RGBA display mode, and handle input events.
 */
int main(int argc, char** argv)
{
    glutInit(&argc, argv);
    glutInitDisplayMode (GLUT_DOUBLE | GLUT_RGBA);
    parent = glutCreateWindow (argv[0]);
    myInit();
    glutKeyboardFunc(Key);
    glutReshapeFunc (myReshape);
    glutDisplayFunc(display);
    create_menu();
    initialize_objects(argc, argv);
    glutMainLoop();
}
```

FIG. 10A

```c
#ifdef WINDOWS
#include <windows.h>
#endif
#include <GL/gl.h>
include <GL/glut.h> include "warp.h"
include <stdio.h>
/**
 * Triangulate a hemisphere and texture coordinates.
 * listNum - display list number
 * numPts -  number of points to a side
 * return the display list
 */
void createHemisphere(int listNum, int numPts, int geom) {
    double incr = 1.0 / numPts;
    double u, v, x, y, z;
    float tx, tz;
    int i, j;

/* start the display list */
    glNewList(listNum, GL_COMPILE_AND_EXECUTE);

/* create the coordinates */
    /* use the square to circle map */
    /* across then down */
    v = 0;
    for (j = 0; j < numPts ; j++) {
     /* start the tri strip */
     glBegin(geom);
     u = 0;
     for (i = 0; i <= numPts; i++) {
         /* do the top point */
         /* get the XYZ coords */
         map(u, v, &x, &y, &z);

/* create the texture coord */
         tx = x / 2 + .5;
         tz = z / 2 + .5;
         if (tx > 1.0 || tz > 1.0 || tx < 0.0 || tz < 0.0) {
          printf("not in range %f %f\n", tx, tz);
         }
         glTexCoord2f(tx, tz);
```

FIG. 10B

```
    /* normal */
    glNormal3f(x, y, z);

/* create the coord */
    glVertex3f(x, y, z);

/* get the XYZ coords */
    map(u, v + incr, &x, &y, &z);

/* create the texture coord */
    tx = x / 2 + .5;
    tz = z / 2 + .5;
    if (tx > 1.0 || tz > 1.0 || tx < 0.0 || tz < 0.0) {
     printf("not in range %f %f\n", tx, tz);
    }
    glTexCoord2f(tx, tz);

/* normal */
    glNormal3f(x, y, z);

/* create the coord */
    glVertex3f(x, y, z);

/* adjust u */
    u += incr;
  }
  /* done with the list */
  glEnd();

/* adjust v */
  v += incr;
 }

/* all done with the list */
 glEndList();
}
```

APPARATUS FOR GENERATING AND INTERACTIVELY VIEWING SPHERICAL IMAGE DATA AND MEMORY THEREOF

This is a Continuation of U.S. application Ser. No. 08/813,873, filed on Mar. 7, 1997 (allowed on Nov. 11, 1998) now U.S. Pat. No. 5,936,630, which is a Continuation of U.S. application Ser. No. 08/478,839, filed on Jun. 7, 1995, which issued as U.S. Pat. No. 5,684,937 on Nov. 4, 1997, which is a Continuation of U.S. application Ser. No. 07/990,250, filed on Dec. 14, 1992 (now abandoned). This is also a Continuation of 09/228,760, filed on Jan. 12, 1999, which claims priority from Provisional Patent Application No. 60/071,148 of Jan. 12, 1998, Ser. No. 09/288,760 being a Continuation-in-Part of U.S. application Ser. No. 08/749,166, filed on Nov. 14, 1996, now U.S. Pat. No. 5,903,782, which claims priority from Provisional Patent Application No. 60/006,800 of Nov. 15, 1995.

BACKGROUND OF THE INVENTION

The present invention relates generally to an apparatus for generating and viewing images. More specifically, the present invention relates to an apparatus for generating and viewing full-surround, e.g., spherical, image data. A corresponding memory is also disclosed.

Systems and techniques for changing the perspective of a visible image in producing a resultant image, and systems and methods of transforming an image from one perspective form to another have been the subject of scientific thought and research for many years. Systems and techniques for transforming visible images can generally be divided into three separate categories:

(1) perspective generation systems and methods suitable for applications such as flight simulators;

(2) three-dimensional (3D) to two-dimensional (2D) conversion systems and methods; and (3) miscellaneous systems and methods.

The first category includes U.S. Pat. No. 3,725,563, which discloses a method of and apparatus for raster scan transformations using rectangular coordinates which are suitable for electronically generating images for flight simulators and the like. More specifically, the '563 patent discloses a technique for raster shaping, whereby an image containing information from one viewpoint is transformed to a simulated image from another viewpoint. Also in this category, U.S. Pat. No. 4,763,280 discloses a curvilinear dynamic image generation system for projecting rectangular coordinate images onto a spherical display surface. In the disclosed system, rectangular coordinates are converted to spherical coordinates and then the spherical coordinates are distorted for accomplishing the desired simulation of curvature.

The second category of systems and techniques perform 3D-to-2 D conversion, or vice versa. For example, U.S. Pat. No. 4,821,209 discloses a method of and apparatus for data transformation and clipping in a graphic display system, wherein data transformation is accomplished by matrix multiplication. Also in this second category, U.S. Pat. No. 4,667,236 discloses a television perspective effects system for providing perspective projection whereby each point of a three-dimensional object is projected onto a two-dimensional plane. New coordinates X' and Y' are derived from the original coordinates X, Y and Z, and the viewing distance D, using the general formulas $X'=XD/Z$ and $Y'=YD/Z$. As the object to be displayed is rotated around the X or Y axis, the viewing distance D is changed for each point.

In the third category, miscellaneous systems and methods are disclosed by, for example, U.S. Pat. No. 5,027,287, which describes a device for the digital processing of images to obtain special geometrical effects wherein digital image data corresponding to intersection points on a rectangular X,Y grid are transposed by interpolation with respect to intersection points of a curved surface. The third category also includes U.S. Pat. No. 4,882,679, which discloses a system and associated method of reformatting images for three-dimensional display. The disclosed system is particularly useful for generating three-dimensional images from data generated by diagnostic equipment, such as magnetic resonance imaging equipment.

However, none of the above described methods or systems permit viewing in circular perspective, which is the best way to view spherical data. Circular perspective provides all that linear perspective does when zoomed in, but it allows the viewer to zoom out to the point where the viewer can see substantially everything in the spherical image data simultaneously in a visually palatable and coherent way.

Moreover, it is often difficult to generate the needed spherical image data set for input to a viewing method or corresponding viewing system. In the field of photography, cameras are often fitted with a variety of wide angle lenses so that still photographs of panoramic views can be taken. In addition, digital image processing has made possible the creation of computer generated images of panoramic views from multiple digital images which are, in turn, derived from pictures taken using cameras fitted with conventional lenses.

Each computer generated image is created by digitally stitching the multiple digital images together using software. However, it is difficult to create a seamless computer image from digital images which are derived from analog-based pictures taken using conventional photography techniques, primarily because it is practically impossible to properly align the camera, which is used to take those pictures, between exposures.

Early attempts at digital image processing have produced computer generated images of panoramic views which are cylindrical in nature. In other words, the computer images generated using conventional digital image processing techniques do not provide any views which are either above or below the camera that produced the original analog based pictures from which the digital images are derived.

With the advent of new digital image processing techniques, software has been developed which allows for the transformation of 360 degrees of visual input data in accordance with a particular perspective. The inventor of the present invention recognized a need for devices and methods of taking pictures which capture 360 degrees of spherical visual input data in order to take advantage of the newly developed digital image processing techniques which have been implemented in software. By way of example, one such software algorithm is described in U.S. Pat. No. 5,684,937, by the inventor of the present invention.

What is needed is an apparatus for generating a full-surround, e.g., spherical, image data set and subsequently viewing that data set in circular perspective. Moreover, what is needed is a memory for storing a full-surround, e.g., a spherical, image data set for subsequent viewing in circular perspective. What is also needed is an apparatus for viewing a spherical image data set in circular perspective which is simple and robust. Preferably, the apparatus for viewing the spherical image data set in circular perspective can include any personal computer (PC) system possessing a three dimensional (3-D) graphics capability.

SUMMARY OF THE INVENTION

Based on the above and foregoing, it can be appreciated that there presently exists a need in the art for apparatuses for generating and viewing spherical image data which overcome the above-described deficiencies. The present invention was motivated by a desire to overcome the drawbacks and shortcomings of the presently available technology, and thereby fulfill this need in the art.

The present invention implements a novel and practical circular perspective viewer for spherical data. Moreover, it implements the circular perspective viewer within the context of existing 3D graphics utilities native to personal computers (PCs). Thus, the novel apparatus for circular perspective viewing is practical for a broad market.

One object according to the present invention is to provide an apparatus for modeling the visible world by texture mapping full-surround image data.

Another object according to the present invention is to provide an apparatus for modeling the visible world by texture mapping full-surround image data, i.e., a spherical image data set, onto a p-surface whereby the resultant texture map is substantially equivalent to projecting full-surround image data onto the p-surface from a point Q inside the region X of the p-surface.

Still another object according to the present invention is to provide an apparatus for modeling the visible world by texture mapping full-surround image data wherein the viewer is allowed to interactively rotate the model.

Yet another object according to the present invention is to provide an apparatus for modeling the visible world by texture mapping full-surround image data wherein the viewer is allowed to interactively change the direction of vision.

A still further object according to the present invention is to provide an apparatus for modeling the visible world by texture mapping full-surround image data, wherein the viewer is allowed to interactively alter the focal length or view angle.

Another object according to the present invention is to provide an apparatus for modeling the visible world by texture mapping full-surround image data, wherein the viewer is allowed to interactively change the direction of view.

Still another object according to the present invention is to provide an apparatus for modeling the visible world by texture mapping full-surround image data, wherein the viewpoint is close to the surface of the p-sphere.

Another object according to the present invention is to provide an apparatus for modeling the visible world by texture mapping full-surround image data, wherein the viewer is allowed to interactively move the viewpoint.

A further object according to the present invention is to provide an apparatus for modeling the visible world by texture mapping full-surround image data, wherein the viewer is allowed to select an area of the image and cause another model of the visible world to be loaded into the viewing system.

Another object according to the present invention is to provide an apparatus for modeling the visible world by texture mapping full-surround image data, wherein the viewer is allowed to perform any combination of actions specified immediately above.

In view of the foregoing, it is also an object of the present invention to provide an apparatus for producing a spherical visual data set in order to provide the input for software algorithms which transform visual input data in accordance with a particular perspective.

It will be appreciated that the above-identified objects are merely exemplary and it is not necessary that any of these objects be realized in invention defined by the appended claims. In other words, only certain, and not all, objects of the invention have been specifically described above. Numerous other objects advantageously may be achieved by the invention, as defined in the appended claims, without departing from the spirit and scope of the invention.

These and other objects, features and advantages according to the present invention are provided by an apparatus for modeling the visible world using a spherical data set. Preferably, the apparatus includes a first device for generating the spherical data set, the first device having a wide angle lens which is pivotable around a predetermined focal point, a second device for selecting a viewpoint within a p-surface, a third device for texture mapping selected data of the spherical image data onto the p-surface such that the resultant texture map is substantially equivalent to projecting the selected data onto the p-surface from the viewpoint to thereby generate a texture mapped p-sphere, and a fourth device for displaying a predetermined portion of the texture mapped p-sphere.

According to one aspect of the inventive apparatus, the selecting device includes elements for selecting the viewpoint and interactively selecting a direction of view to thereby interactively display portions of the texture mapped p-sphere. According to another aspect of the invention, the apparatus also includes a device for replacing a first the texture mapped p-sphere by a second the texture mapped p-sphere by interactively selecting the viewpoint from a plurality of viewpoints within the second texture mapped p-sphere.

These and other objects, features and advantages according to the present invention are provided by a camera system adapted to take at least two pictures from a single focal point and different directions of view to facilitate generation of a seamless spherical image that represents a 360° field of view of the visible world from the single focal point. Preferably, the camera system includes a camera and a camera support device that supports the camera and allows the camera to be repositioned in such a manner as to provide accurate registration between the different directions of view. According to a first aspect of the present invention, the camera is equipped with a wide-angle lens. According to a second aspect of the present invention, the camera is equipped with a fisheye lens.

These and other objects, features and advantages according to the present invention are provided by a memory which stores a seamless spherical image data set formed from N circular image data sets captured by a single lens, wherein the circular image data sets are taken from a single focal point of the lens, and wherein N is a positive integer greater than 1. Preferably, N equals 2, and each of the N circular image data sets corresponds to a hemispherical projection onto a plane. Alternatively, N is greater than 2, and each of the N circular image data sets corresponds to circular projection onto a plane.

BRIEF DESCRIPTION OF THE DRAWINGS

These and various other objects, features and aspects of the present invention will be readily understood with reference to the following detailed description taken in conjunction with the accompanying drawings, in which like or similar numbers are used throughout, and in which:

FIG. 8 is a high level block diagram of a circular perspective viewing system according to the present invention;

FIGS. 9A, 9B, 9C, 9D, 9E, 9F, 9G, 9H, 9I, and 9J collectively form a listing of the dedicated code for converting a general purpose computer system into the circular perspective viewing system illustrated in FIG. 8;

FIGS. 10A and 10B collectively form a listing of an exemplary code block for triangulating a hemisphere and texture coordinates;

DETAILED DESCRIPTION OF THE PREFERRED EMBODIMENTS

Figure 1:
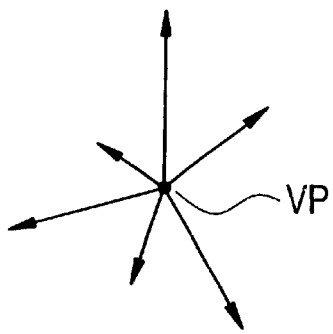
FIG. 1 illustrates a set of all rays from a predetermined viewpoint, which illustration facilitates an understanding of the present invention.

The method and corresponding apparatus according to the present invention are similar to that disclosed in U.S. Pat. No. 5,684,937, which patent is incorporated herein by reference for all purposes, in that it generates perspective views derived for constants less than or equal to two, and greater than or equal to one, i.e., $1.0 \leq X \leq 2.0$. However, it will be appreciated that the inventive method and apparatus are different from U.S. Pat. No. 5,684,937 in that the method for deriving perspective is different than 'explicitly' dividing all angles by a selected constant, as disclosed in the '937 patent. Instead, the angles are 'implicitly' divided by a constant by moving the viewpoint around inside a "p-sphere". Additional details will be provided below.

Additionally, U.S. Pat. No. 5,684,937 also discloses that a closed data set advantageously can be formed from several circular images without parallax or other discontinuity problems by taking each of the circular images from a single focal point. The resultant seamless data set can be likened to what the user would see if the user were located at the center of a sphere looking out from the focal point. Hereinafter, this data set will be referred to as a spherical image data set. It will be noted, as discussed in greater detail below, that the several types of wide angle lenses, e.g., a fisheye lens, generate circular images. All such wide angle lenses are considered to fall within the scope of the present invention.

By employing the method and corresponding apparatus according to the present invention, it is possible to create a virtual PICTOSPHERE™ using a conventional 3-D graphics system. Preferably, the inventive method and apparatus texture map the visible world onto a sphere. It should be mentioned that when the user selects a viewpoint at the center of this sphere and renders the view using the primitives of a conventional 3D graphics system, the user implicitly divides all angles by one, which results in a linear perspective view. However, when the user selects a viewpoint on the surface of this sphere, selects a direction of view towards the center, and renders the view using the primitives of a conventional 3D graphics system, the user implicitly divides all angles by two, thus creating a circular perspective view. Moreover, by allowing the viewpoint to move around within or on the sphere, the user achieves results virtually identical to those achieved by U.S. Pat. No. 5,684,937 for constants ranging from 1.0 to 2.0.

It will be appreciated that the method and corresponding apparatus according to the present invention constitute a novel and practical circular perspective viewer of a spherical image data set. The inventive method and apparatus advantageously can be achieved within the context of existing 3-D graphics utilities and hardware native to PCs. It will be apparent from the statement immediately above that the inventive method and apparatus advantageously can be implemented in a broad range of existing systems.

Figure 2:
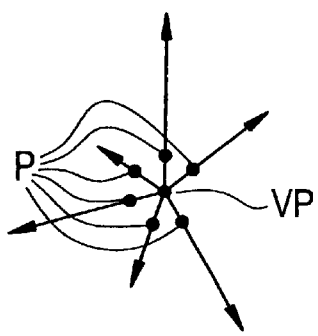
FIG. 2 illustrates a set of points, excluding the viewpoint, located on a corresponding one of the rays, which illustration facilitates an understanding of the present invention.

The method and corresponding apparatus according to the present invention are predicated on the following starting, i.e., given, conditions:

(1) the set of all rays V from a given point VP, as illustrated in FIG. 1;

(2) a set of points P not including VP, each point in P being contained by one and only one ray in V, as illustrated in FIG. 2; and (3) the set of color values C, each color in C being associated with one and only one ray in V, and also thereby associated with the point in P contained by that ray.

Moreover, the following definitions apply:

(1) POINTS P: The visible world.

Figure 3:
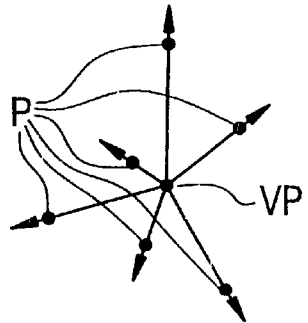
FIG. 3 illustrates the formation of a projection of the set of points, or a subset thereof, illustrated in FIG. 2.
Figure 4A:
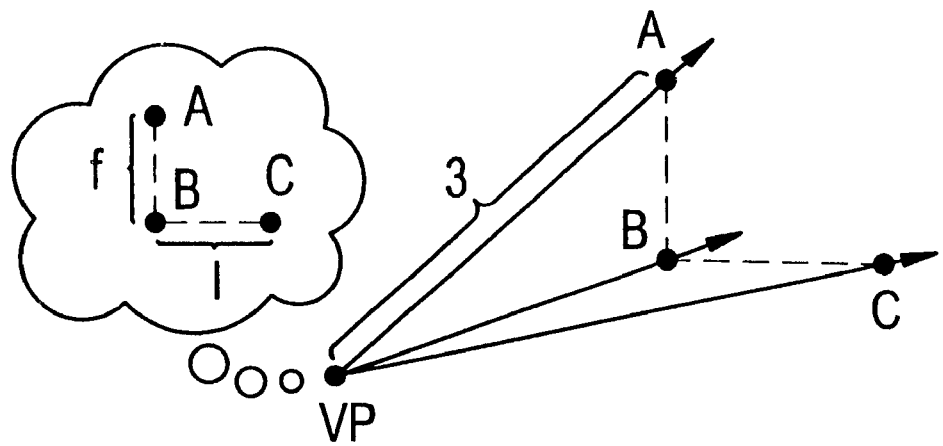
FIGS. 4A and 4B illustrate the resultant images generated by two different projections, respectively, given a constant viewpoint.
Figure 4B:
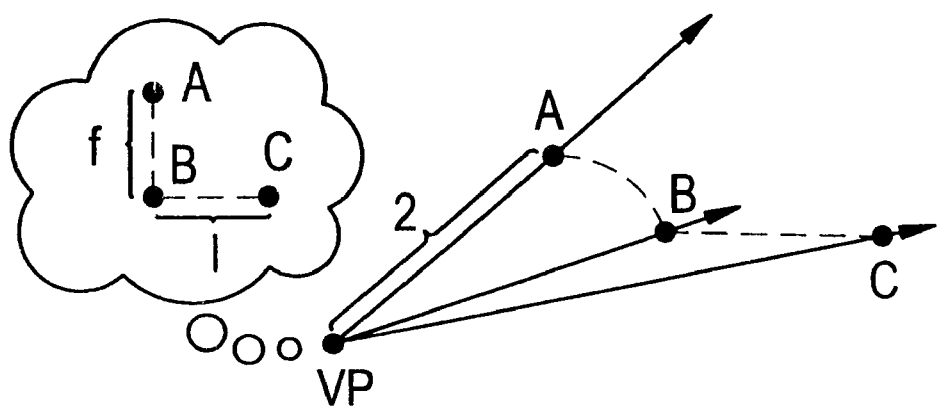

(2) A PROJECTION OF P: A subset of points P. Any number of points Pn contained in P may be slid closer to or further from point VP along their corresponding rays. The resultant new configuration of points P is called a projection of P. The concept can best be understood by referring to FIG. 3;

(3) MAGIC POINT, VIEWPOINT, OR POINT OF PROJECTION: Point VP. Please note, no matter how points P are projected, their appearance will remain the same when viewed from point VP. This latter concept may best be understood by referring to FIGS. 4A and 4B.

(4) FULL-SURROUND IMAGE DATA: data which samples the points P. This data encodes, explicitly or implicitly, the association of a color value with a given direction from a given point of projection. It should be mentioned at this point that full-surround image data is useful in many fields of entertainment because, when delivered to many viewers, it enables the construction of an independent viewing system defined below.

(5) P-SPHERE: a computer graphics representation of any polyhedron where there exists at least one point x inside (neither intersecting, nor lying outside) the polyhedron which may be connected to every point of the polyhedron with a distinct line segment, no portion of which line segment lies outside the polyhedron or intersects the polyhedron at a point not an endpoint. The union of all such points x form the region X of the p-sphere. For a convex p-sphere, the region X is all points of the interior of the p-sphere. Examples of computer graphics objects which may be modeled as p-spheres include a tetrahedron, a cube, a dodecahedron, and a faceted sphere.

(6) P-SURFACE: a computer graphics representation of any surface with a well-defined inside and outside, where there exists at least one point x inside (neither intersecting, nor lying outside) the surface which may be connected to every point of the surface with a distinct line segment, no portion of which line segment lies outside the surface or intersects the surface at a point not an endpoint. The union of all such points x form the region X of the p-surface. For a convex p-surface, the region X is all points of the interior of the p-surface. Examples of computer graphics objects which may be modeled as p-surfaces include: a tetrahedron; a cube; a sphere; an ellipsoid; a cylinder; an apple torus; a lemon torus; and b-spline surfaces, either closed or periodic, in u and v. A p-sphere is a p-surface.

Figure 5:
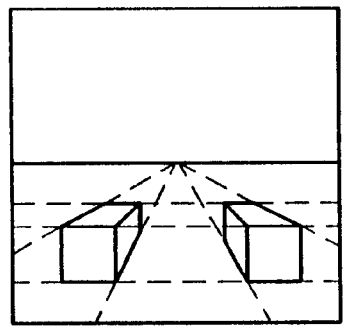
FIG. 5 illustrates the concept of linear perspective.

(7) LINEAR PERSPECTIVE: the projection of a portion of the visible world onto a plane or portion of a plane, as illustrated in FIG. 5.

Figure 6:
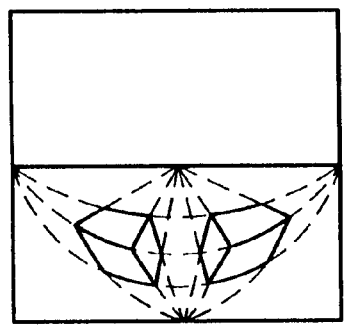
FIG. 6 illustrates the concept of circular perspective.
Figure 7:
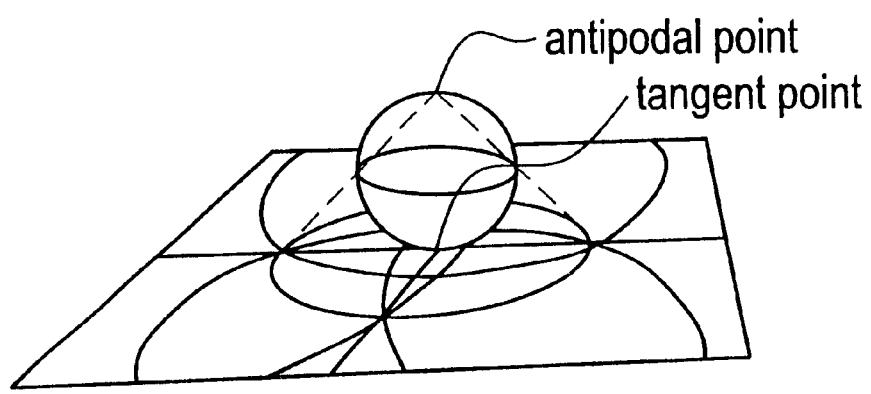
FIG. 7 illustrates the concept of stereographic projection.

(8) CIRCULAR PERSPECTIVE: the projection of the visible world, or portion thereof onto a plane, or a portion of a plane, after performing the perspective transformation of the visible world according to U.S. Pat. No. 5,684,937, where the constant used is 2. After such a transformation, when the direction of vision specified in the transformation is perpendicular to the projection plane, there is a one-to-one mapping of all the points P defining the visible world and all the points of an infinite plane. This definition is illustrated in FIG. 6;

(9) STEREOGRAPHIC PROJECTION: the one-to-one mapping of each point on a sphere to each point of an infinite tangent plane, the mapping being performed by constructing the set of all rays from the antipodal point of the tangent point, the intersection of the rays with the plane defining the mapping. The understanding of this definition will be facilitated by reference to FIG. 7. Please note that circular perspective and stereographic projection produce geometrically similar (identically proportioned) mappings when the direction of vision specified in the perspective transformation of circular perspective contains the tangent point specified in stereographic projection;

(10) INDEPENDENT VIEWING SYSTEM: an interactive viewing system in which multiple viewers can freely, independently of one another, and independently of the source of the image data, pan that image data in all directions with the effect that each viewer feels like they are "inside" of that imagery, or present at the location from which the imagery was produced, recorded, or transmitted; and

(11) STANDARD COMPUTER GRAPHICS SYSTEM: a computer graphics system which supports linear perspective viewing, including the changing of the focal length or the altering of the view angle, the apparent rotation of viewed objects, and/or the apparent changing of direction of vision, and the texture mapping of image data onto objects within the class of a p-surface.

It will be appreciated that, in a standard computer graphics system, by texture mapping full-surround image data onto a p-surface such that the resultant texture map is effectively equivalent to projecting the full-surround imagery onto the p-surface from some point Q contained in the region X of the p-surface, a representation of the visible world is achieved.

Referring to FIGS. 9A through 9G, the method for viewing full-surround, e.g., spherical, image data will now be described. It should be mentioned that the corresponding code implementing the inventive method is written in the "C" language, although a plurality of programming languages are well known and readily adapted to this purpose. It will also be appreciated that code lines starting with "gl" or "glut" indicate calls to a conventional graphics library (GL) such as OpenGL™. One of ordinary skill in the art will readily appreciate that the last function in this listing is called main ( ). This is where the program starts.

It will be appreciated from inspection of FIGS. 9A through 9G that the routine main( ) calls various glut . . . functions to set up GL, the graphics library used here. It will be noted that the glut . . . functions are part of GL. Furthermore, it will be appreciated that main( ) registers or maps certain keyboard events with GL with glutKeyboardFunc(Key). In other words, glutKeyboardFunc (Key) defines the response of the inventive method to operation of the corresponding "Key."

Moreover, Key( ) is a function describing the actions of GL to keyboard events. Of importance are keyboard events ('z' and 'Z') which move the viewpoint in and out along the Z axis relative to the "p-sphere", effectively altering the perspective of the view, and keyboard events (55, 57, 52, 54, 56 and 50) which control rotation of the "p-sphere", effectively allowing the viewer to "look around".

It will be noted that main( ) registers the function display( ) with GL, with the glutDisplayFunc(display) function. Moreover, display( ) uses the global variables controlled by Key( ) to move the viewpoint along the Z axis relative to the "p-sphere", and to rotate the "p-sphere"relative to a constant direction of view.

Preferably, display( ) builds the "p-sphere" with glCallList(current_texture→tex1) and glCallList(current_ texture→tex2). In the first instance, tex1 is mapped to a triangulation approximating a hemisphere, and is added to the display list. In the second instance, tex2 is mapped to the same hemisphere—after rotating it 180 degrees to form a sphere—and is also added to the display list, in the function readTexture( ). Preferably, tex1 and tex2 are texture maps built from two pictures, respectively, taken with a fisheye lens from a single viewpoint, although multiple circular images taken with a wide angle lens advantageously can be employed in forming the spherical image data set. Advantageously, tex1 and tex2 collectively comprise a "PICTOSPHERE™." It should be noted that the triangulation approximating the hemisphere was built in the function createHemisphere( ), the full listing of which is found in FIGS. 10A and 10B and not FIGS. 9A–9G.

At this point, Key( ) and display( ) have been registered with GL. The code main( ) then calls initialize_objects( ) which actually calls the routines readTexture( ) and createhemisphere( ). All the other functions are support functions.

It will be appreciated that the user now has an instance of a p-sphere in GL made by mapping two fisheye images shot from substantially the same focal point, e.g., photographs, to two adjoining hemispheres to thereby generate a full-surround, e.g., spherical, data set. The user advantageously can interactively move the viewpoint away from the center of the p-sphere and, if so desired, very near the inside surface of the p-sphere. It should be mentioned at this point that the direction of view is still towards the center of the p-sphere. Moving the viewpoint from the center of the p-sphere automatically generates a circular perspective view, which advantageously can be displayed on display screen 20 of the PC illustrated in FIG. 8. Moving back to the center of the p-sphere, permits the user to generate a linear perspective view. It will also be appreciated from the discussion above that it is possible to rotate the surface of p-sphere, thus simulating looking around within the p-sphere.

It should be mentioned that by setting the viewpoint of the graphics system close to the center point of the p-sphere point and then enabling the viewer to rotate that p-sphere around a point close to the center point of the p-sphere, an independent viewing system providing linear perspective is achieved. Moreover, by adding the firther capability of altering the focal length or angle of view, a zoom ability advantageously can be provided for the user.

It should also be mentioned that in the case where the p-surface used to model the visible world is a good approximation of a sphere, that is, a substantially better model than a tetrahedron or a cube, and where the viewpoint of that representation is close to the approximate center of that p-surface, then by allowing the viewer to move the viewpoint away from the center point to a point close to the surface of the p-surface, an independent viewing system is achieved in circular perspective. This is astounding when one considers that the native graphics system of a conventional PC only supports viewing in linear perspective. The method and corresponding apparatus according to the present invention acheives this astounding breakthrough by employing stereographic projection, which is geometrically similar to circular perspective.

Furthermore, by letting the viewer move the viewpoint outside of the p-surface, the viewer can get a feeling for how the independent viewing works. This can be useful for designers of systems containing many hyper-linked full-surround surfaces. For example, many p-spheres picturing the penthouse terraces of New York City advantageously can be linked together so that the viewer may hop from p-sphere to p-sphere, simulating a tour of the terraces.

The above described method of the invention may be performed, for example, by the apparatus shown in FIG. 8. This viewing apparatus is composed of a central processing unit (CPU) 10 for controlling the components of the system in accordance with a control program stored in read-only memory (ROM) 60 or the like. The CPU 10 stores temporary data used during execution of the inventive method, i.e., viewing method, in random-access memory (RAM) 40. After the majority of the method steps are performed, the generated visible points are displayed on display device 20 (e.g., cathode ray tube (CRT) or liquid crystal display (LCD)) as visible points in accordance with the appropriate color values stored in color table 30, e.g., a color lookup table (CLUT) found in the graphics controller in most PCs. Advantageously, a spherical data generator device 70, such as a camera or the like, and preferably the data generator system disclosed in U.S. Pat. No. 5,903,782, which issued May 11, 1999, which patent is discussed immediately below, may be used to generate different color values corresponding to the visible points of a viewed object, image or picture. An input device 50 is provided for entering data such as the viewer's viewing direction, reference plane, configuration (scaling) factor k, and other pertinent information used in the inventive viewing method.

As discussed above, the present invention includes an apparatus and corresponding method for producing a three-hundred and sixty degree (360°) spherical visual data set using a camera fitted with a lens having a particular field of view, i.e., a wide angle lens.

Figure 11:
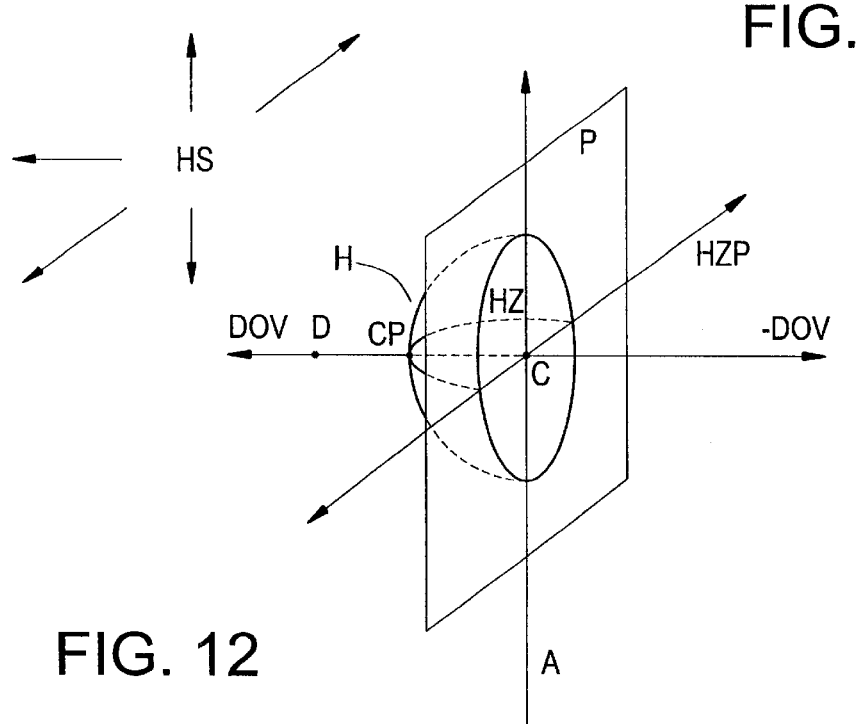
FIG. 11 depicts the field of interest within a field of view of a lens used in conjunction with a present embodiment of the invention.

FIG. 11 depicts a field of interest within a field of view of a lens used in an embodiment of the present invention. The field of interest is some designated 90 degree radius (180 degree) portion of the lens' field of view. This 180 degree portion may be represented as a hemisphere (H) defined by a half-space (HS), which is, in turn, defined by a plane (P). A center point (CP) is designated as the point on the hemisphere furthest from the plane (P).

The direction of vision or view (DOV) is a ray extending from a point (C) in the plane (P) through the center point (CP), point (C) also being the center of the hemisphere (H). Another ray (−DOV) extends from the point (C) in the opposite direction as the ray (DOV). A horizon (HZ) is a circle on the hemisphere (H) that intersects with the center point (CP). A vertical axis (A) is the line on the plane (P) which is perpendicular to an orthogonal projection (HZP) of horizon (HZ) which is also in the vertical plane (P).

Figure 12:
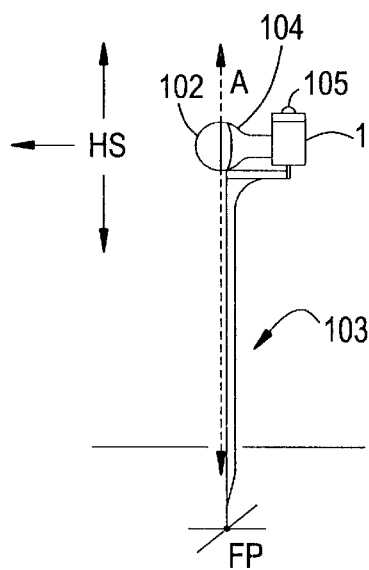
FIG. 12 depicts one embodiment of the present invention which uses a monopod as a mounting support member for a camera having a lens.

FIG. 12 depicts an exemplary apparatus for producing a spherical image data set employed in at least one embodiment of the present invention. The apparatus supports a camera (101) having a lens (102). The camera (101) is mounted on a monopod (103) which is aligned with the vertical axis (A). However, numerous other mounting support members may be employed, such as the tripod described in connection with FIG. 13 below.

The monopod (103) is placed on the ground at a foot point (FP) on the vertical axis (A). The foot point (FP) is a point in a predetermined plane of reference which may be the ground. Preferably, the camera (101) and its associated lens (102) are mounted on the monopod (103) such that neither the camera (101) nor the lens casing (104) are within the half-space (HS). Although a bubble level (105) is placed on the camera, one of ordinary skill will appreciate that the bubble level (105) may be mounted on the monopod (103) instead.

The bubble level (105) should be mounted so that when it is level, the vertical axis (A) will be plumb with respect to the predetermined plane of reference. The plumbness of the vertical axis (A) should be maintained with respect to the predetermined plane of reference and the lens (102) aligned azimuth-wise in the plane (P) described above in connection with FIG. 11. Preferably, a fixed light source is also aligned in the plane (P). A first picture is then taken. Subsequently, the apparatus is pivoted one-hundred and eighty degrees around the vertical axis while maintaining the foot point (FP) in the same position in preparation for the taking of an additional picture.

Another plumbing device may be employed in lieu of the bubble device. By way of example, the bubble level may be replaced with two tube levels which are positioned at right angles to one another.

Figure 13:
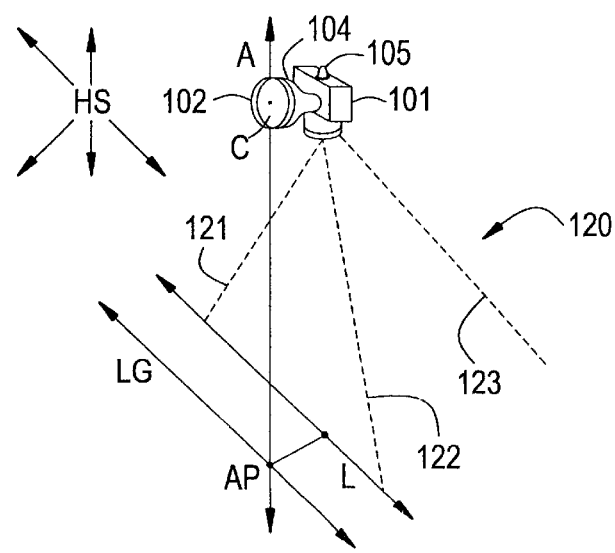
FIG. 13 depicts another embodiment of the present invention which uses a tripod as a mounting support member for a camera having a lens.

If the camera and its associated lens are too heavy to put on a monopod, then a tripod can be employed as the mounting support member. A tripod is especially advantageous in time lapse photography or motion picture photography. An embodiment of the present invention employing a tripod is shown in FIG. 13. Elements depicted in FIG. 13 which are similar to those shown in FIG. 12 retain their same identifier. These elements include the camera (101), lens (102), lens casing (104), and bubble level (105).

The tripod (120) is adjusted so that its two front legs (121) and (122) form a plane roughly parallel to the vertical axis (A). The third leg (123) can be extended or retracted to achieve this objective. The line (L) connects the feet of the front legs (121) and (122) which are adjusted so that the line (L) is parallel to the plane (P). In this configuration, the tripod forms roughly a right-angled three-sided prism.

Preferably, no part of the tripod is within the half-space (HS). Point (AP) where axis (A) intersects the ground is determined using a plumb line dropped from the point (C) to the ground. The point (AP) corresponds to the point (FP) depicted in FIG. 12.

Figure 14A:
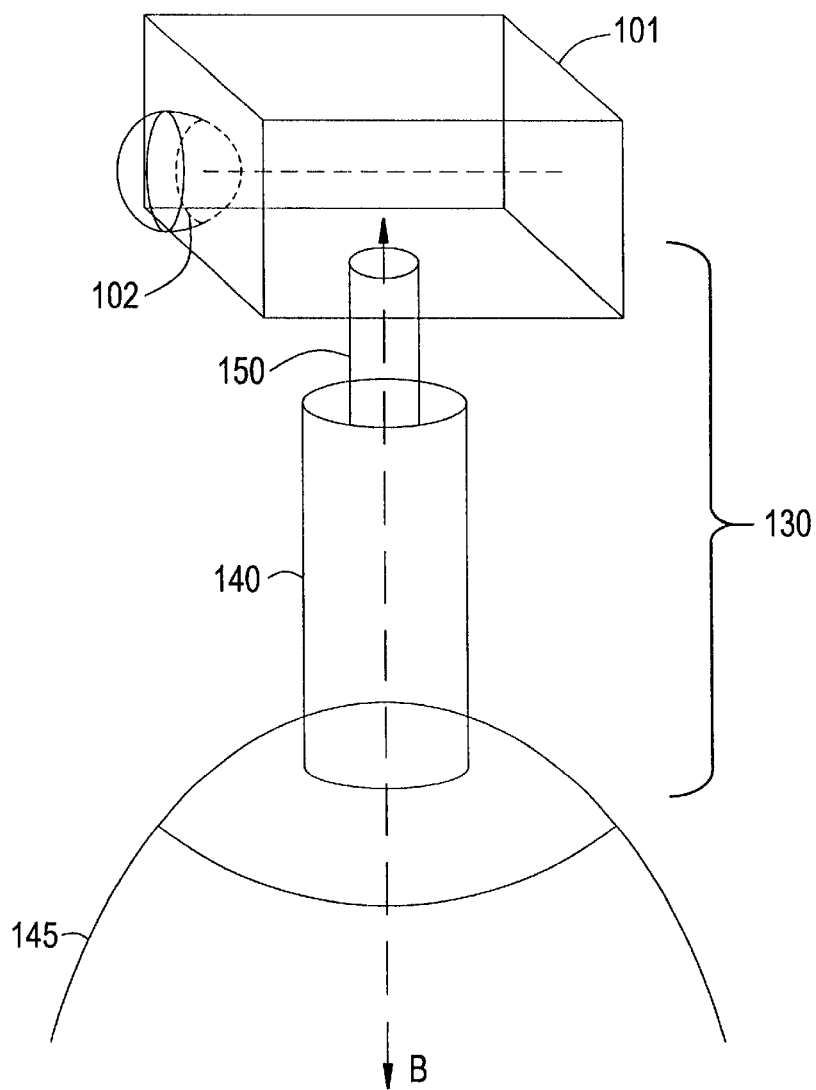
FIGS. 14A, 14B, and 14C depict features of a mounting component which is employed in an embodiment of the present invention.
Figure 14B:
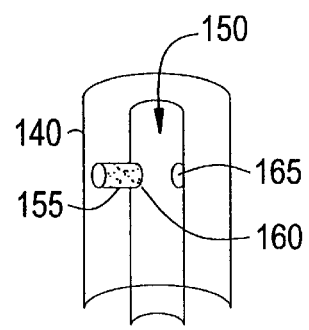
Figure 14C:
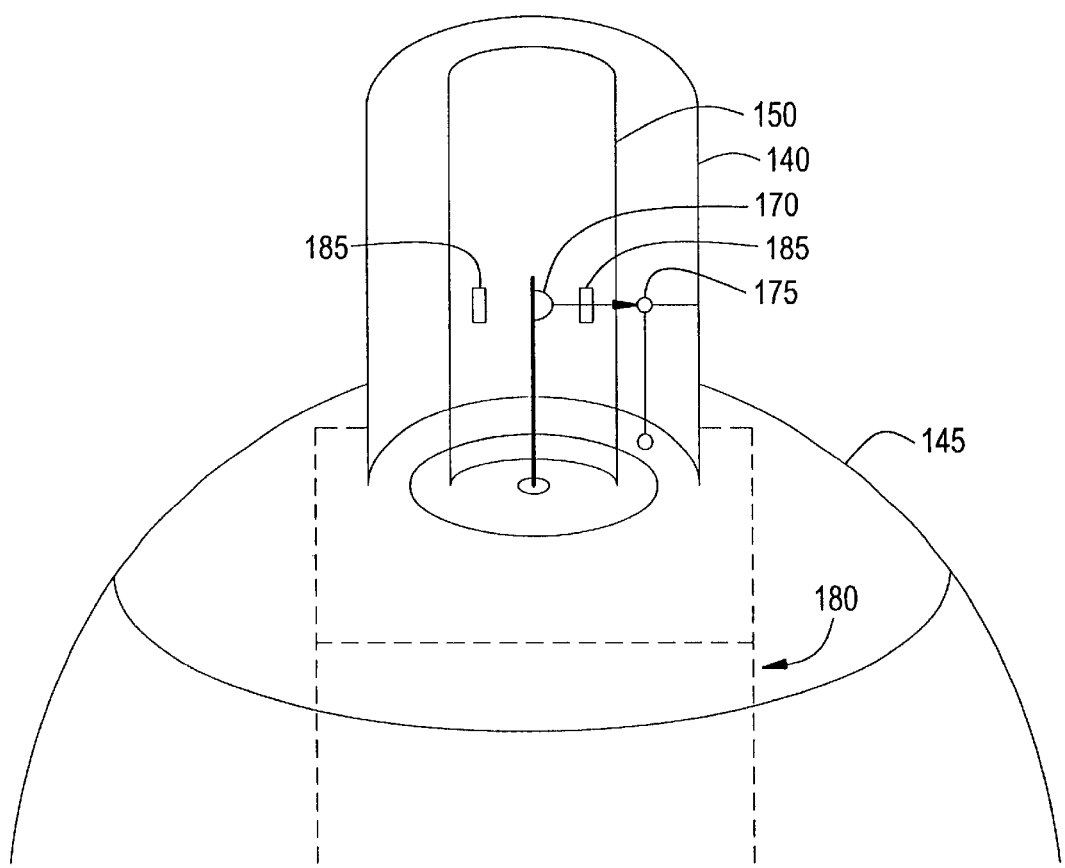

Further refinements are possible with respect to the above-described embodiments of the present invention. Specifically, an apparatus according to the present invention may also include a mounting component (130), as shown in FIGS. 14A, 14B and 14C. Elements which are similar to those shown in FIG. 11 retain their same identifier. These elements include the camera (101) and the lens (102). The mounting component (130) includes an outer sleeve (140) which is detachably connected to the mounting support member (145). The mounting component (130) also includes an inner cylinder (150) which is detachably connected to the camera (101). The inner cylinder (150) rotates inside the outer sleeve (140) around axis (B) and clicks into place in a first direction (D) or a second opposite direction (−D) through the use of a spring-loaded pin (155) which is included in the outer sleeve (140), as shown in FIG. 14B.

The spring-loaded pin (155) forms a tight fit with either of two rounded notches (160 and 165) on opposite sides of the inner cylinder (150). The mounting component (130) can be adjusted so that the axis (A) of the field of interest of the lens (102) can be aligned with axis (B) when the camera (101) is attached to the mounting support member (145) via the mounting component (130).

As a further refinement, the mounting component (130) can be fitted with an LED (170) and optical sensor (175) instead of the spring-loaded pin (155), as shown in FIG. 14C. In this regard, the rotation of the inner cylinder (150) of the mounting component (130) can be electro-mechanically controlled via an electro-mechanical controller (180) in response to the detection of a light beam from the LED (170) or alternative light source by the optical sensor (175). The electro-mechanical controller (180) is positioned beneath the surface of the mounting support member (145) and is operatively connected to the inner cylinder (150) to control the rotation thereof. However, the electro-mechanical controller (180) need not be positioned beneath the surface of the mounting support member (145).

More specifically, the light beam, which is produced by the LED (170) disposed within the inner cylinder (150) of the mounting component (130), can be detected by the optical sensor (175), which is disposed on the outer sleeve (140) of the mounting component (130), through a slit (185) in the inner cylinder (130). However, those of ordinary skill in the art will appreciate that the LED (170) could be disposed on the outer sleeve (140) of the mounting component, while the optical sensor (175) is disposed within the inner cylinder (150) of the mounting component (130).

The camera (101) which is detachably connected to the inner cylinder (150) rotates in accordance with the rotation of the inner cylinder (150) so that the camera (101) can be made to take a picture in one direction (DOV) and then in an opposite direction (−DOV).

An additional embodiment of an apparatus according to the present invention can be realized by utilizing a mounting support member which is capable of supporting two cameras and two opposing lenses, the lenses being aligned so that point (CP) for each lens faces in opposite directions. However, parallax problems may result from the use of two cameras to the extent that each lens is prevented from being physically located so that the respective focal points of the lenses are identical. In this regard, the size of the cameras and the lens casings are important considerations because of the parallax problems which may arise from their combined use. It will be appreciated that the parallax problem would prevent the formation of a substantially seamless spherical image data set.

Advantageously, the apparatus can also be provided with a registering means for registering ray (DOV) or ray (−DOV). However, the registering means may register a predetermined reference ray other than ray (DOV) or ray (−DOV). By way of example, the registering means may be comprised of finder scopes, or a combination of laser reflection and photoelectric elements. Alternatively, the registering means may include a gyroscopic element.

The mounting support member can also include a gimbal mount which fits around a circular lens casing. However, the gimbal mount's axis should be made coincident with line (HZP) shown in FIG. 11 and the legs should be positioned so that they are coincident with plane (P), which is also shown in FIG. 11.

Advantageously, the mounting support member can be made of transparent and non-reflective materials in order to reduce the chance that the picture will be corrupted by the presence of the mounting support member in the resulting picture.

Figure 15:
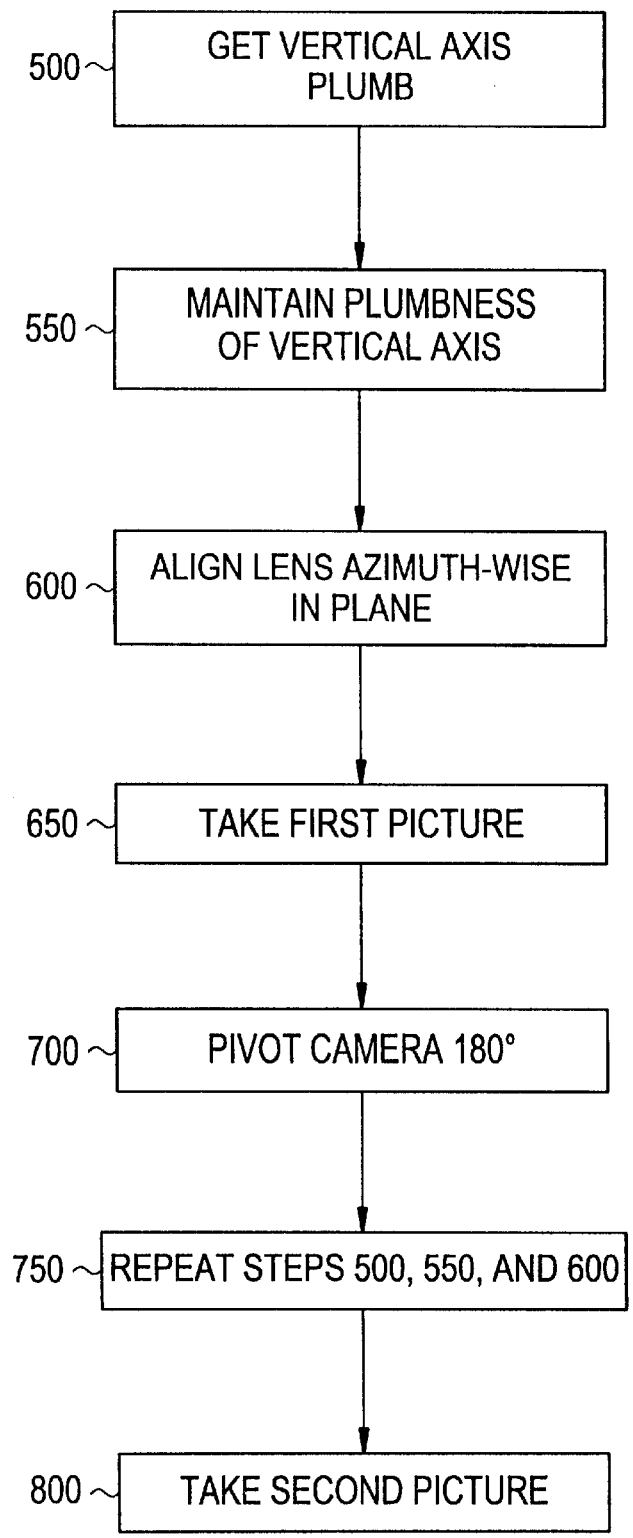
FIG. 15 is a flow chart which depicts a method according to one aspect of the present invention.

A method of producing a 360° spherical visual input data set is also provided in accordance with the present invention. The method is described with reference to the lens having the exemplary field of view shown in FIG. 11, although the method works equally well with any wide angle lens. The flow chart depicted in FIG. 15 identifies the steps of the method.

According to the present invention, the method includes the step 500 of getting the vertical axis (A) plumb with respect to a predetermined plane of reference which may be the ground. This step 500 can be accomplished using a plumbing device such as the bubble level described above or a conventional plumb line. The method also includes the step 550 of maintaining the plumbness of the vertical axis (A) with respect to the predetermined plane of reference and the step 600 of aligning the lens azimuth-wise in the plane (P). Preferably, a fixed light source is also aligned in plane (P) in order to provide adequate lighting for the taking of the picture.

In addition, the method also includes the step 650 of taking a first picture using the camera and the step 700 of pivoting the camera 180 degrees around the axis (A). By way of example, if a monopod is being used as the mounting support member for the camera and its associated lens, as shown in FIG. 2, the monopod is rotated 180 degrees while keeping the foot print (FP) the same.

However, if a tripod is used as the mounting support member instead of the monopod, as shown in FIG. 13, then a line (LG) is first delineated on the ground (or an alternate predetermined plane of reference) representing the intersection of plane (P) with the ground. The line (LG) also passes through the point (AP), as discussed above in connection with FIG. 13. The tripod is then adjusted so that its front two legs rest on a line (L) which is roughly parallel to the line (LG).

The remaining leg is then adjusted until the plumbing device indicates that the vertical axis (A) is plumb. The first picture is then taken using the camera. Subsequently, the entire apparatus is rotated 180 degrees. The proper alignment of the apparatus is confirmed by determining whether the front two feet of the tripod again form a line which is parallel to the line (LG) and by determining whether point (C) forms a line which is plumb and which contains the point (AP).

Following the pivoting of the camera and its associated lens, steps 500, 550 and 600 are repeated in step 750. Finally, in step 800 a second picture is taken to complete the acquisition of three-hundred and sixty degrees (360°) of spherical visual data.

As mentioned above, it will be appreciated that the viewing method and corresponding viewing apparatus according to the present invention advantageously can be used in an audiovisual or multimedia entertainment system. In particular, since each user advantageously can select his or her preferred viewpoint and direction of view, multiple users can receive a single set of full-surround image data and generate corresponding multiple display images, in either linear or circular perspective.

Although the preferred embodiments of the present invention have been described, the spirit and scope of the invention is by no means restricted to what is described above. For example, a digital camera may be employed avoiding the necessity of converting analog based pictures into digital format to facilitate the production of computer generated images using software algorithms which transform the spherical image data set in accordance with a particular perspective. Thus, although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A memory which stores a substantially seamless spherical image data set formed from N circular image data sets captured by a single lens, wherein the N circular image data sets are taken from a single point of the lens, and wherein N is a positive integer greater than 1.

2. The memory as recited in claim 1, wherein:
   N equals 2; and
   each of the N circular image data sets corresponds to a hemispherical projection onto a plane.

3. The memory as recited in claim 1, wherein:
   N is greater than 2; and
   each of the N circular image data sets corresponds to circular projection onto a plane.

4. The memory as recited in claim 1, wherein all of the N circular image data sets are disposed within the memory so as to permit selection and subsequent display of a rectangular image generated from combined data extractable from at least two of the N circular image data sets.

5. A system for acquisition of a substantially seamless spherical data set and subsequent display of a selected portion thereof on a display, comprising:
   means for capturing at least two circular images from a single point and different directions of view;
   means for transferring the circular images to a memory of a computer;
   means for combining the circular images into a substantially seamless spherical data set; and
   means for processing a selected portion of the substantially seamless spherical data set for presentation on the display of the computer.

6. The system as set forth in claim 5, further comprising means for digitizing each of the circular images, wherein the digitizing means is disposed within the capturing means.

7. The system as set forth in claim 5, wherein the capturing means comprises a camera optically coupled to a single wide-angle lens.

8. The system as set forth in claim 5, wherein the capturing means permits the taking of at least two respective pictures with a single camera with each respective picture being registered with respect to the previously-taken picture.

9. The system as recited in claim 5, wherein the selected portion of the substantially seamless spherical data set includes data from two adjacent circular images.

10. The system as recited in claim 5, wherein the processing means comprises:
    a first software module for reading the selected portion of the substantially seamless spherical data set to thereby generate a read spherical data; and
    a second software module for processing the read spherical data to thereby generate a rectangular image suitable for output on the computer display.

11. The system as recited in claim 10, wherein the processing means is controlled by an input device operated by a system user.

12. The system as recited in claim 5, wherein:
    the processing means and the computer display are disposed within the computer; and
    the processing means is controlled responsive to operation of an input device coupled to the computer.

13. The system as recited in claim 5, wherein:
    the at least two circular images comprise two hemispherical images; and
    the combining means comprises software for registering data corresponding to a first of the two hemispherical images with additional data corresponding to a second of the two hemispherical images.

14. The system as recited in claim 5, further comprising means for selecting a magnification level at which the selected potion of the substantially seamless spherical data set is to be displayed on the display.

15. The system as recited in claim 5, further comprising:
    means for selecting a magnification level at which the selected potion of the substantially seamless spherical data set is to be displayed on the computer display;
    wherein the processing means comprises:
      a first software module for reading the selected portionof the substantially seamless spherical data set to thereby generate a read spherical data set; and
      a second software module for processing the read spherical data set to thereby generate a rectangular image suitable for output on the computer display.

16. The system as recited in claim 15, wherein the selecting means and the first and second software modules respond to an input device operated by a system user.

17. The system as recited in claim 15, wherein the processing means and the selecting means comprise software.

18. The system as recited in claim 15, wherein:
    the processing means, the selecting means, and the display are disposed within a computer; and
    the processing means and the selecting means respond to an input device operated by a user of the computer.

19. The system as recited in claim 15, wherein:
    the at least two circular images comprise two hemispherical images; and
    the combining means comprises software for registering data corresponding to a first of the two hemispherical images with additional data corresponding to a second of the two hemispherical images.

20. The system as recited in claim 5, further comprising an input device operatively connected to the processing means for selecting a magnification level at which the selected potion of the substantially seamless spherical data set is displayed on the computer display.

21. The system as recited in claim 5, wherein the combining means comprises software which digitally stitches together the at least two respective digital images.

22. A system which acquires image content corresponding to all pixels visible from a predetermined point using a camera generating circular images, which stores the content as a substantially seamless spherical data set, and which displays a selected portion of the substantially seamless spherical data set, comprising:
   a camera equipped with a lens which acquires N circular images from the predetermined point and different directions of view;
   a memory which stores the N circular images as the substantially seamless spherical data set; and
   a processor which generates a rectangular image from the selected portion ofthe substantially seamless spherical data set suitable for output on a computer display,
   where N is an integer greater than or equal to two.

23. The system as set forth in claim 22, wherein:
   the system further comprises the display; and
   the memory, the processor, and the computer display are disposed within a computer.

24. The system as set forth in claim 22, wherein the memory is disposed within the camera.

25. The system as set forth in claim 22, wherein the camera acquires at least two digital images, and the memory stores the digital images comprising the substantially seamless spherical data set as registered digital images.

26. The system as recited in claim 22, wherein the selected portion of the substantially seamless spherical data set includes data from two adjacent circular images.

27. The system as recited in claim 22, further comprising an input device permitting selection of the selected portion of the substantially seamless spherical data set.

28. The system as recited in claim 22, further comprising an input device permitting selection of the selected portion ofthe substantially seamless spherical data set and the magnification level of the resultant rectangular image.

29. The system as recited in claim 22, wherein the lens comprises a fisheye lens.

30. The system as recited in claim 22, further comprising:
   a tripod; and
   a camera mount coupling the camera to the tripod which permits the camera to pivot about the predetermined point to thereby acquire the N circular images from the predetermined point and different directions of view.

31. The system as recited in claim 22, further comprising:
   a stationary support; and
   a mounting support member coupling the camera to the stationary support, which mounting support member is rotatable about a rotation axis which is coplanar with a plane that is perpendicular to the optical axis of the lens of the camera.

32. The system as recited in claim 31, wherein the stationary support comprises a tripod.

33. The system as recited in claim 22, further comprising:
   a stationary support; and
   a mounting support member coupling the camera to the stationary support, which mounting support member is rotatable about a rotation axis which is coplanar with a plane that is perpendicular to the optical axis of the lens of the camera.

34. The system as recited in claim 22, further comprising:
   a stationary support; and
   a mounting support member coupling the camera to the stationary support, which mounting support member is rotatable about a rotation axis which bisects and is coplanar with a plane corresponding to a 180° field of view of the lens of the camera.

35. The system as recited in claim 22, further comprising:
   a stationary support; and
   a mounting support member coupling the camera to the stationary support, which mounting support member is rotatable about a rotation axis which bisects and is coplanar with a plane that is perpendicular to the optical axis of the lens of the camera and which corresponds to a 180° field of view of the lens of the camera.

36. The system as recited in claim 22, wherein:
   the lens has a plane corresponding to a 180° field of view;
   the system further comprising:
      a stationary support; and
      a mounting support member coupling the camera to the stationary support, wherein:
         the mounting support member is rotatable about a rotation axis which is coplanar with the plane;
         the camera does not intersect the rotation axis; and
         the rotation axis intersects the lens.

37. The system as recited in claim 22, wherein the processor instantiates software for digitally stitching together the at least two respective digital images.

38. A system for acquiring a substantially spherical visual image data set using a fisheye lens having at least a 180° field of view defined by a plane intersecting the fisheye lens, and for processing at least a selected portion of the substantially spherical visual image data set for display as a two-dimensional (2D) image, comprising:
   an assembly comprising the fisheye lens coupled to a camera;
   a stationary support;
   a mounting support member, coupling the assembly to the stationary support, which mounting support member has a rotation axis that is coplanar with the plane and which supports the assembly while the assembly acquires first and second hemispheric images, each representing the 180° field of view;
   a memory which stores the substantially spherical visual image data set corresponding to the respective hemispherical images; and
   a processor which generates the 2D image responsive to the selected portion of the substantially spherical visual image data set.

39. The system as recited in claim 38, wherein the mounting support member includes at least one detent mechanism which permits the assembly to rotate between first and second predetermined positions for acquiring the respective hemispherical images.

40. The system as recited in claim 38, wherein the rotation axis is not vertical.

41. The system as recited in claim 38, wherein the stationary support comprises a tripod.

42. The system as recited in claim 38, wherein the plane corresponds to a seam between respective hemispherical images.

43. A system for acquisition of a substantially seamless spherical data set and subsequent display of a selected portion thereof on a display, comprising:

means for capturing at least two circular images from a single point and different directions of view;

means for transferring the circular images to a memory of a computer;

means for combining the circular images into a substantially seamless spherical data set; and means for processing a selected portion of the substantially seamless spherical data set for presentation on the display of the computer, the processing means comprising:

a first software module for reading the selected portion of the substantially seamless spherical data set to thereby generate a read spherical data; and a second software module for processing the read spherical data to thereby generate a rectangular image in linear perspective suitable for output on the computer display.

44. A system for acquisition of image content corresponding to all pixels visible from a predetermined point and subsequent display of a selected portion of the image content thereof on a display, comprising:

means for capturing two hemispherical images from the predetermined point and different directions of view;

means for storing the hemispherical images corresponding to the pixels visible from the predetermined point; and means for processing a selected portion of the pixels for presentation on the display of the computer, the processing means comprising:

a first software module for reading selected pixels corresponding to a first portion of a first of the hemispherical images and a second portion of a second of the hemispherical images to thereby generate a first and second read pixel data; and a second software module for automatically processing the first and second read pixel data to thereby generate a singular rectangular image in linear perspective suitable for output on the computer display.

* * * * *